United States Patent
Scharf et al.

(10) Patent No.: US 8,115,139 B2
(45) Date of Patent: Feb. 14, 2012

(54) HEATABLE INFRARED SENSOR AND INFRARED THERMOMETER COMPRISING SUCH AN INFRARED SENSOR

(75) Inventors: Stefan Scharf, Berlin (DE); Stefan Neth, Bad Vilbel (DE); Bernhard Kraus, Braunfels (DE)

(73) Assignee: Kaz USA, Inc., Southborough, MA (US)

( * ) Notice: Subject to any disclaimer, the term of this patent is extended or adjusted under 35 U.S.C. 154(b) by 41 days.

(21) Appl. No.: 10/571,149

(22) PCT Filed: Aug. 20, 2004

(86) PCT No.: PCT/EP2004/009327
§ 371 (c)(1),
(2), (4) Date: Mar. 9, 2006

(87) PCT Pub. No.: WO2005/029021
PCT Pub. Date: Mar. 31, 2005

(65) Prior Publication Data
US 2007/0023414 A1 Feb. 1, 2007

(30) Foreign Application Priority Data
Sep. 9, 2003 (DE) .................................. 103 41 433

(51) Int. Cl.
*B23K 3/02* (2006.01)
(52) U.S. Cl. .......... 219/221; 219/553; 219/543; 338/28; 600/454
(58) Field of Classification Search .................. 600/454, 600/323, 339, 473, 549; 374/121; 219/221, 219/553, 543; 250/338.1; 338/25, 28, 308
See application file for complete search history.

(56) References Cited

U.S. PATENT DOCUMENTS

| 4,035,613 A | | 7/1977 | Sagawa et al. |
| 4,378,489 A | * | 3/1983 | Chabinsky et al. ............ 219/543 |
| 4,805,296 A | * | 2/1989 | Jinda et al. ...................... 29/620 |

(Continued)

FOREIGN PATENT DOCUMENTS

DE 37 09 201 9/1988

(Continued)

OTHER PUBLICATIONS

Muhlstein et al., High-Cycle Fatigue of Single-Crystal Silicon Thin Films, Dec. 2001, Jouranl of Microelectromechanical Systems, vol. 10, No. 4, pp. 593-600.*

(Continued)

*Primary Examiner* — Mark Paschall
(74) *Attorney, Agent, or Firm* — Stroock & Stroock & Lavan LLP

(57) ABSTRACT

An infrared sensor with an electrically heatable sensor housing. The housing including a heating device in the form of a strip conductor-like electric heating track, which is controlled by a control device, and applied onto a ceramic substrate. The ceramic substrate comprises an electrically insulated ceramic material providing adequate thermal conductivity and preferably forming the bottom of the sensor housing, and carrying at least one infrared sensor element, e.g., a thermopile sensor. The ceramic substrate having electric strip conductors serving as a contact surface for a corresponding (not-shown) housing cover and through-hole contacts serving as electrical connections between the top side and the bottom side of the ceramic substrate. The electric heating tracks and strip conductors in a preferred embodiment comprise thick-film tracks. The infrared sensor being suitable for a measuring tip of an intra-auricular infrared thermometer.

21 Claims, 1 Drawing Sheet

U.S. PATENT DOCUMENTS

| | | | |
|---|---|---|---|
| 5,010,315 A | 4/1991 | Fedter et al. | |
| 5,202,665 A * | 4/1993 | Hafele | 338/25 |
| 5,323,025 A * | 6/1994 | Ito et al. | 257/81 |
| 5,610,571 A * | 3/1997 | Kuzuoka | 338/22 R |
| 6,076,962 A * | 6/2000 | Chen | 374/130 |
| 6,348,650 B1 * | 2/2002 | Endo et al. | 136/201 |
| 6,626,835 B1 | 9/2003 | Kraus | |
| 6,694,174 B2 * | 2/2004 | Kraus et al. | 600/474 |
| 6,819,217 B2 * | 11/2004 | Wienand et al. | 338/25 |
| 2002/0149312 A1 * | 10/2002 | Roberts et al. | 313/495 |
| 2003/0147449 A1 * | 8/2003 | Chavan et al. | 374/137 |
| 2003/0183921 A1 * | 10/2003 | Komobuchi et al. | 257/704 |
| 2003/0222218 A1 * | 12/2003 | Nozu | 250/338.1 |
| 2005/0045702 A1 * | 3/2005 | Freeman et al. | 228/254 |

FOREIGN PATENT DOCUMENTS

| | | |
|---|---|---|
| EP | 1 081 475 | 3/2001 |
| EP | 1 136 801 | 9/2001 |
| EP | 1267399 A2 * | 12/2002 |
| GB | 2 148 676 | 5/1985 |
| GB | 2148676 A * | 5/1985 |
| KR | 10-2001-39856 | 1/2003 |
| KR | 10-2001-39856 A | 1/2003 |
| WO | WO00/58703 | 10/2000 |
| WO | WO 0058703 A1 * | 10/2000 |

OTHER PUBLICATIONS

Korean Office Action dated Jun. 16, 2009 issued in Korean Patent Application No. 10-2006-7004880.

* cited by examiner

HEATABLE INFRARED SENSOR AND INFRARED THERMOMETER COMPRISING SUCH AN INFRARED SENSOR

This application relates to infrared sensors and thermometers, particularly thermometer for taking an intra auricular temperature.

BACKGROUND

Patent No. EP 1 081 475 A2 discloses an infrared sensor comprising one or more heating/cooling elements that are connected in a thermally conductive fashion to the sensor housing and/or a diathermanous window of the sensor housing. The heating/cooling elements may comprise, for example, a heating element such as a NTC resistor or PTC resistor, or a transistor, or a heating and cooling element that is realized in the form of a Peltier element. They may also consist of a film, e.g., a polyimide film, onto which a metal layer is applied similar to strip conductors, wherein said metal layer consists, for example, of aluminum, copper, gold or a chrome-nickel alloy or a silver-graphite paste. The sensor housing and the diathermanous window consist of materials with high thermal conductivity in order to maintain occurring temperature gradients as low as possible. The housing consists, for example, of copper and the window consists of silicone. The infrared sensor is used in the measuring tip of an infrared thermometer for taking an intra-auricular temperature.

SUMMARY

According to one aspect of the invention, the sensor housing comprises a ceramic substrate with an electric heating track structure applied thereon. Consequently, the electric heating device can be integrated into the sensor housing. As a result, additional separate heating elements required in previous devices can be eliminated making complicated electric contacting processes no longer necessary. The heat distribution within the sensor housing can be optimized with a suitable configuration of the heating track structure. In one embodiment that configuration may comprise one or more strip conductor-like heating tracks realized in accordance with the respective design requirements.

In a preferred embodiment, the ceramic substrate comprises a ceramic material with high thermal conductivity, such as aluminum or beryllium oxide ceramic, or aluminum nitride ceramic. As a result, undesirable temperature gradients in the sensor housing are minimized. Moreover, the ceramic substrate has excellent electrical insulation properties, such that the at least one heating track can be accommodated in a space-saving fashion, allowing it, in some embodiments, to extend close to installed electric or electronic components. A nominal housing temperature can be reached and, if required, stabilized by controlling the electric heating power in accordance with the requirements.

In addition to the strip conductor-like heating track structure, the ceramic substrate may also comprise electric strip conductors, and through-hole contacts that serve as electric connecting or contacting devices for the electric or electronic components installed in the sensor housing. In a preferred embodiment, the electric heating tracks and the electric strip conductors are realized in the form of thick-film tracks conventionally applied onto the ceramic substrate. A purposeful variation of the electric conductivity of the resistor paste used for the electric heating tracks makes it possible to adapt the electric resistance of this heating track to the geometry of the sensor housing in accordance with the respective requirements and to optimally adjust the respectively required heating power.

In a preferred embodiment, thick-film hybrid technology also makes it possible to realize the required through-hole contacts that are significantly smaller than conventional glass seals or glazings used in the TO-housing technology. Consequently, it is possible to have a significantly larger number of electrical connections leading outward, while the space requirement remains the same. The glazings also restrict the space in the interior of a TO-housing such that a heater is difficult to integrate for space reasons. However, the present thick-film heating track structure represents both an exceptionally spacesaving and effective electric heating device that can be easily applied onto a suitable ceramic region of the sensor housing. Thus, it can be integrated into a sensor housing in an unproblematic fashion.

According to another aspect of the invention, the present infrared sensor is particularly suitable for use in an infrared thermometer. It may be installed, for example, in the measuring tip of a conventional infrared thermometer for taking the temperature intraauricularly. In this case, the infrared sensor is arranged directly on the front end of the measuring tip in order to bring the front end to a desired temperature by heating the infrared sensor. When the correspondingly temperature measuring tip is inserted into the auditory canal of a user, the thermal equilibrium at this location is practically not disturbed such that measuring errors are largely prevented. In some embodiments, the measuring tip can have a conventional shape or design, and be realized flexibly.

In a preferred embodiment, the ceramic substrate with the heating track structure applied thereon can be realized in the form of a housing bottom of the sensor housing, wherein at least one infrared sensor element for converting the measured infrared radiation into an electric output signal, e.g., a thermopile sensor, and other electric and electronic components can be arranged on said housing bottom. The electric strip conductors for these components and the electric heating tracks can be realized on the top side as well as on the bottom side of the housing bottom, wherein the electrical connection between the top side and the bottom side is realized with the aid of through-hole contacts in the housing bottom. The geometry of the individual tracks can be optimally adapted to the geometry of the top side and the bottom side of the housing bottom. The housing bottom can also be realized noticeably thinner than a conventional TO-housing bottom by utilizing a ceramic substrate instead of a metal alloy.

In a preferred embodiment, the ceramic substrate can have a very symmetric base surface, e.g., a round, oval, square, hexagonal or octagonal base surface. This allows—in contrast to the TO-housing technology—the cost-efficient processing of the ceramic substrate in the form of a panel, during the installation of the components being enclosed in the housing and the cover. However, the ceramic substrate may also have any other shape depending on the respective requirements.

According to another aspect of the invention, a control device can provide control over the electric heating power of the heating tracks according to the requirements of the infrared sensor or infrared thermometer comprising such an infrared sensor, in order to exactly adjust the housing temperature. This control device makes it possible to determine the temperature of the infrared sensor based on, for example, predetermined parameters of the at least one electric heating track or the at least one infrared sensor element. If required, the temperature of the infrared sensor can also be determined from the measuring signals of at least one separate temperature sensor. In a preferred embodiment, the control device controls or regulates the respectively required supply of electric energy for the heating process, and for maintaining the temperature constant. An adjustable nominal temperature value can be predetermined for this purpose. The control device and the at least one electric heating track can be connected to an electric energy source, for example, a battery.

It should be appreciated that utilizing a ceramic housing with a heating track structure applied thereon for heating a housing to a desired temperature is not restricted to this special field of application, but can be utilized, in other embodiments, in connection with a series of electric or electronic components to be tempered that are enclosed in a housing.

One noteworthy example in this respect are the aforementioned TO-housings, in which conventional housing bottoms of steel or other metal alloys, e.g., KOVAR® (18% Co, 28% Ni and 54% Fe), are used as the bottom material. Since these bottom materials only have a relatively low thermal conductivity, possibly required heating processes only take place in a relatively slow and inhomogeneous fashion. The utilization of a suitable ceramic substrate with an electric heating and strip conductor structure applied thereon as the bottom material, in contrast, not only allows noticeably faster heating processes, but also leads to a more uniform temperature distribution in the housing. Since the heater is practically also integrated into the housing in an exceptionally space-saving fashion, it is no longer necessary to provide a separate heating element that would have to be contacted by means of a suitable method as it is the case with a TO-housing.

Further objects, advantages, and features and application possibilities of the present invention will become apparent from the subsequent description of a preferred embodiment of the invention in connection with the corresponding figures

DETAILED DESCRIPTION

Figure 1:
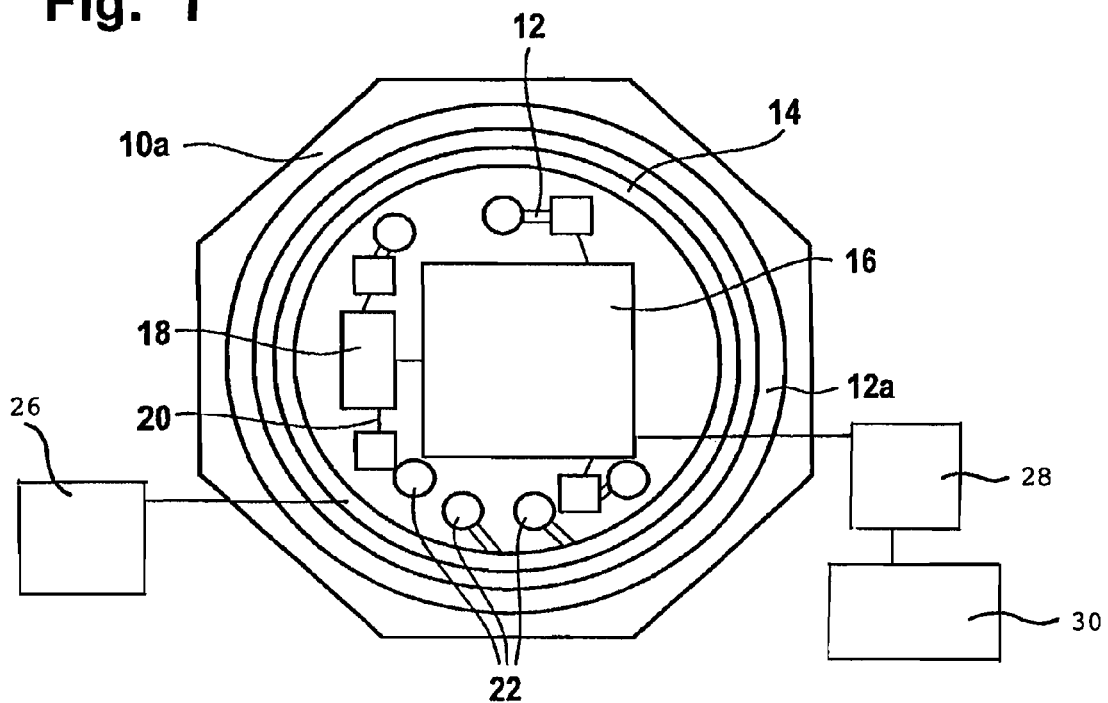
FIG. 1 is a top view of an exemplary housing bottom of a sensor housing according to the invention.

In a preferred embodiment, the housing bottom 10 shown in FIG. 1 comprises an electrically insulating ceramic substrate having adequate thermal conductivity. The ceramic substrate comprises, for example, aluminum or beryllium oxide ceramic or aluminum nitride ceramic or the like.

In this embodiment, housing bottom 10 has an octagonal base surface such that an inexpensive manufacture in the form of panels, and a simple separation therefrom are ensured. However in other embodiments, the housing bottom may—depending on the intended use have any other shape, such as round, oval, square, or hexagonal base surfaces, which are used in practical applications for the aforementioned reasons.

On the top side 10a of the housing bottom 10, a peripheral, annular strip conductor 12a is provided as a contact surface for an assigned, correspondingly shaped housing cover (that is not illustrated in the figures) with a diathermanous window. The connection between the housing bottom 10 and the corresponding housing cover can be realized, for example, by means of bonding. An adhesive with a particular high thermal conductivity can be used in order to optimize the heat transfer.

A slightly smaller, concentrically arranged annular heating track 14 is spaced apart from the contact strip 12a. This heating track can be connected to a control device 26 that is able to control the electric heating power of the heating track 14 as required. The respectively required electric heating power can be delivered by an (also not-shown) electric battery in this embodiment.

The heating track 14 surrounds an infrared sensor 16 (a thermopile sensor in a preferred embodiment) that is arranged in the center of the housing bottom 10, and other electronic components that comprise an electronic circuit 18 and several printed strip conductors 12 that are connected to one another by means of wire bond connections 20. In addition, several through-hole contacts 22 are provided as vacuum-tight electrical connections with the bottom side 10b of the housing bottom 10 that is illustrated in FIG. 2.

The thermopile sensor 16 can be connected to measuring electronics 28 for acquiring and evaluating its temperature signals. The measuring electronics also evaluate the signals of another temperature sensor that, in a preferred embodiment, consists of the heating track 14. The evaluated temperature signals can be displayed in the form of a measured temperature value on a display device 30.

Figure 2:
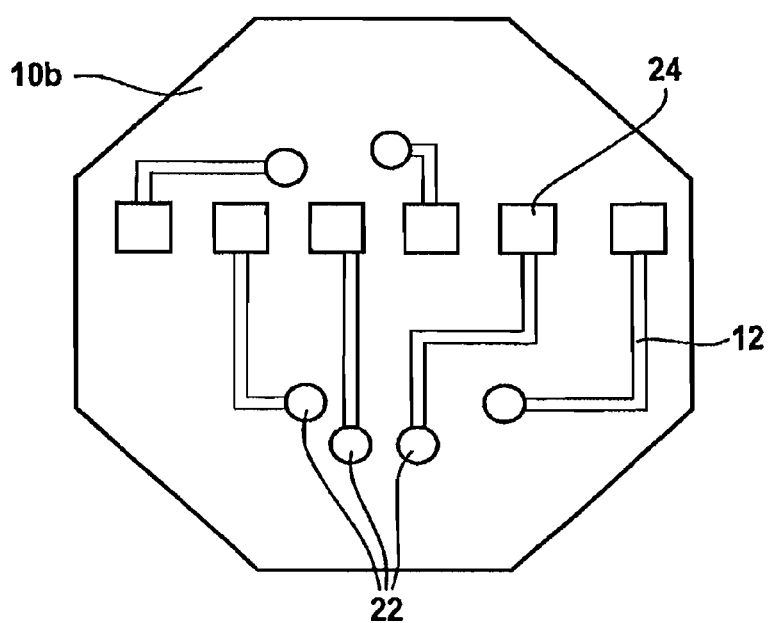
FIG. 2 is a bottom view of the housing bottom according to FIG. 1.

The bottom side 10b of the housing bottom 10 shown in FIG. 2 also comprises a corresponding number of through-hole contacts 22 that can be connected to assigned printed strip conductors 12. These strip conductors are regionally realized in the form of connecting pads 24. These connecting pads can be connected to assigned circuit boards by means of conventional techniques, e.g., soldering or bonding.

The electric heating track 14 and the electric strip conductors 12 can be realized in the form of printed thick-film structures, wherein the electric strip conductors 12 or the electric connections consist of thick-film pastes with a correspondingly low resistance, and the electric heating track 14 consists of thick-film pastes with a higher resistance. In one preferred embodiment of an infrared sensor according to the invention, the strip-shaped heating track 14 is not arranged on the top side 10a, but rather on the bottom side 10b of the housing bottom. However, it is also possible to apply heating tracks or strip conductors 14 or 12 on the top side 10a as well as the bottom side 10b of the housing bottom 10.

The housing bottom 10 shown with the electric or electronic components arranged thereon forms an infrared sensor together with a corresponding (not-shown) housing cover, for example, an infrared sensor to be installed into the measuring tip of an infrared thermometer for taking the temperature intraauricularly. The housing bottom serves as a vacuum-tight lead-through for electric signals from the interior of the sensor housing toward the outside.

The invention claimed is:

1. An infrared sensor comprising:
   an electrically heatable sensor housing comprising a ceramic substrate and at least one infrared sensor element disposed on the ceramic substrate, wherein
   said ceramic substrate includes at least one strip conductor-like electric heating track, which electric heating track substantially encircles the at least one infrared sensor;
   the at least one strip conductor-like electric heating track heats said electrically heatable sensor housing by passing electric current through the at least one strip conductor-like electric heating track; and
   the ceramic substrate comprises an electrically-insulating ceramic material with a thermal conductivity sufficient to reduce temperature gradients in the electrically heatable sensor housing.

2. The infrared sensor according to claim 1, wherein the electrically-insulating ceramic material comprises aluminum oxide ceramic, aluminum nitride ceramic or beryllium oxide ceramic.

3. The infrared sensor according to claim 1, wherein the ceramic substrate forms a bottom of the sensor housing.

4. The infrared sensor according to claim 1, wherein the at least one strip conductor-like electric heating track comprises a thick-film track.

5. The infrared sensor according to claim 1, wherein the ceramic substrate comprises electric strip conductors and through-hole contacts.

6. The infrared sensor according to claim 5, wherein the electric strip conductors are implemented in the form of thick-film strips.

7. The infrared sensor according to claim 1, further comprising at least one temperature sensor.

8. The infrared sensor according to claim 1, wherein the at least one infrared sensor element senses temperature.

9. The infrared sensor of claim 1, further comprising a heating track controller configured to control a heat output of the at least one strip conductor-like electric heating track so as to adjust a temperature of the electrically heatable sensor housing.

10. An intra-auricular infrared thermometer comprising:
an infrared sensor disposed in a measuring tip of the thermometer;
said infrared sensor comprising an electrically heatable sensor housing comprising a ceramic substrate and at least one infrared sensor element disposed on the ceramic substrate and fashioned to sense an intra-auricular temperature, wherein said ceramic substrate includes at least one strip conductor-like electric heating track, which electric heating track substantially encircles the at least one infrared sensor; and
a display on which the sensed temperature is displayed as a measured temperature value,
wherein the at least one strip conductor-like electric heating track heats said electrically heatable sensor housing by passing electric current through the at least one strip conductor-like electric heating track, and
the ceramic substrate comprises an electrically-insulating ceramic material with a thermal conductivity sufficient to reduce temperature gradients in the electrically heatable sensor housing.

11. The infrared thermometer according to claim 10, further comprising a heating track controller electrically coupled to the at least one strip conductor-like electric heating track and configured to control heat output of the at least one strip conductor-like electric heating track.

12. The infrared thermometer according to claim 11, further comprising a control device for controlling the determination of the temperature of the infrared sensor based on predetermined parameters of the at least one strip conductor-like electric heating track.

13. The infrared thermometer according to claim 11, further comprising a control device for controlling the determination of the temperature of the infrared sensor based on predetermined parameters of said infrared sensor.

14. The intra-auricular infrared thermometer of claim 10, wherein the electrically-insulating ceramic material comprises aluminum oxide ceramic, aluminum nitride ceramic, or beryllium oxide ceramic.

15. The infrared thermometer of claim 11, wherein the heating track controller controls the heat output of the at least one strip conductor-like electric heating track so as to adjust a temperature of the electrically heatable sensor housing.

16. A method of detecting intra-auricular temperature comprising:
inserting a measuring tip of an infrared thermometer into an auditory canal;
heating a ceramic substrate of a sensor housing of thermometer having an infrared sensor element disposed thereon, the infrared sensor element being fashioned to sense intra-auricular temperature by passing electric current through a strip conductor-like electric heating track disposed on the ceramic substrate, which electric heating track substantially encircles the at least one infrared sensor; and
displaying a temperature sensed by the infrared sensor element,
wherein the ceramic substrate comprises an electrically-insulating ceramic material with a thermal conductivity sufficient to reduce temperature gradients in the sensor housing.

17. The method of claim 16, wherein the electrically-insulating ceramic material comprises aluminum oxide ceramic, aluminum nitride ceramic, or beryllium oxide ceramic.

18. The method of claim 16, wherein the ceramic substrate forms a bottom of the sensor housing.

19. The method of claim 16, wherein said strip conductor-like electric heating track comprises a thick-film track.

20. The method of claim 16, wherein the ceramic substrate comprises electric strip conductors and through-hole contacts.

21. The method of claim 16, further comprising controlling a heat output of the strip conductor-like electric heating track so as to adjust a temperature of the sensor housing.

* * * * *